Jan. 31, 1967   W. R. SIMONS ETAL   3,301,072
RATE GYROSCOPES
Filed July 30, 1964   4 Sheets-Sheet 2

INVENTORS:
WILLIAM RICHARD SIMONS
DAVID LEONARD JUDD

ATTORNEYS:
Hall, Pollock + Vande Sande

INVENTORS:
WILLIAM RICHARD SIMONS
DAVID LEONARD JUDD
ATTORNEYS:
Hall, Pollock & Vande Sande

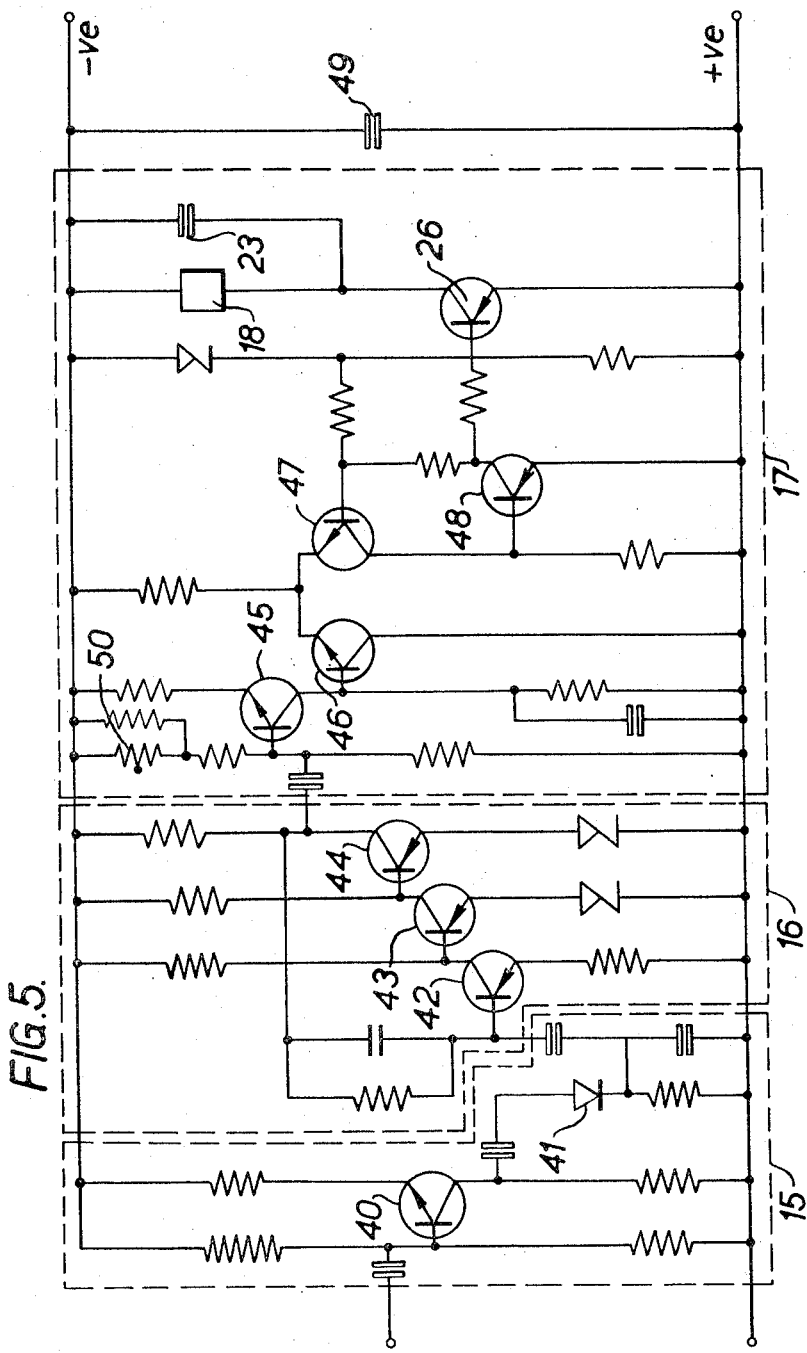

United States Patent Office 3,301,072
Patented Jan. 31, 1967

3,301,072
RATE GYROSCOPES
William Richard Simons and David Leonard Judd, Cheltenham, England, assignors to S. Smith & Sons (England) Limited, Cricklewood, London, England, a British company
Filed July 30, 1964, Ser. No. 386,180
Claims priority, application Great Britain, Aug. 10, 1963, 31,675/63
20 Claims. (Cl. 74—5.6)

This invention relates to rate gyroscopes, that is to say, to gyroscopes of the kind having a rotor which is rotated in operation at a uniform angular velocity about a spin axis and which is mounted so that it can precess against a resilient restraint about a precession axis at right angles to the spin axis. Upon rotation of the gyroscope about an input axis at right angles to the spin and precession axes, the rotor precesses about the precession axis in accordance with the rate of rotation about the input axis. In the absence of rotation about the input axis the rotor is held by the resilient restraint in a datum angular position about the precession axis. A pick-off device is normally provided which detects precession of the rotor away from its datum angular position and generates a signal in accordance with the rate of rotation of the gyroscope about the input axis.

Drive for rotating the gyroscope about its spin axis is normally achieved by means of an electric motor, the gyroscope rotor being provided as the rotor of the motor. A form of motor which is commonly used is that known as a hysteresis motor and examples of hysteresis motors are given in our British patent specifications Nos. 576,248 and 576,249. The hysteresis motor is of a general kind in which electrical stator windings are arranged to subject a rotor to a rotating magnetic field acting transversely of the spin axis, the magnetic field and the rotor, in normal lightly-loaded conditions, rotating together at the same speed so that magnetic poles are produced at the periphery of the rotor. Motors of this kind are referred to hereinafter as of the kind specified, and other examples of motors of this kind are to be found in wound-rotor synchronous motors.

According to this invention we provide a rate gyroscope including a motor of the kind specified and means for providing a magnetic field which interacts with the magnetic poles of the rotor so as to exert a force on the rotor tending to rotate the rotor about the precession axis of the gyroscope.

The correct operation of a rate gyroscope is dependent upon the rotor being capable of rotation, by precession, about the precession axis and therefore it is useful to be able to check whether in fact such rotation is possible for example each time the gyroscope is to be used. Such a check may be readily made when a rate gyroscope in accordance with the preceding paragraph is used by arranging that the magnetic poles in the rotor and said further magnetic field are provided concurrently and then detecting whether a signal is generated by the pick-off. If the rotor is free to rotate about the precession axis the interaction of the magnetic poles and magnetic field, and the consequent rotation of the rotor about the precession axis, will result in a signal being generated by the pick-off in the same way as for precession.

Preferably the means for providing a magnetic field comprise an electromagnet arranged to be energised from the same alternating current source as the stator windings of the motor.

Preferably the electromagnet comprises a yoke of magnetic material which surrounds the rotor and lies in the plane in which the spin and input axes both lie, the yoke being provided with at least one pole piece which projects towards the precession axis and is spaced apart from the input axis, and with a winding arranged to be energised from the same alternating current source as the stator windings of the motor.

According to a feature of this invention we provide an arrangement including a rate gyroscope as specified in the preceding paragraphs, in combination with means for detecting whether the rotational speed of the rotor about the spin axis has, at least substantially, a predetermined value.

The angle through which the rotor precesses about the precession axis is dependent on the rotational speed of the rotor about the spin axis so that it is desirable to determine whether or not the rotational speed is at a predetermined value.

According to another aspect of this invention we provide an arrangement comprising a rate gyroscope including a synchronous alternating current motor having the characteristic that when the rotor is lightly loaded and is rotating at synchronous speed a low frequency oscillation is superimposed on the rotational motion of the rotor, means for deriving a voltage signal dependent on the current flowing in a stator winding of the motor, a demodulator which is connected so as to be fed with said voltage signal and which is responsive to a modulation component of said signal, which component is dependent upon said oscillation of the rotor, and indicating and/or controlling means responsive to the output signal of the demodulator.

We have found that a synchronous alternating current motor has the characteristic that when the rotor is lightly loaded and is rotating at synchronous speed, a low frequency oscillation is superimposed on the rotational motion of the rotor. This characteristic will be referred to as the stated characteristic.

The current flowing, in operation, through a stator winding of a synchronous alternating current motor having the stated characteristic, when the rotor is rotating at synchronous speed, is amplitude modulated with a component having the frequency of oscillation of the rotor. The demodulator in this condition produces an output signal having the frequency of the modulating component. If, however, the rotor is not rotating at synchronous speed, the rotor does not oscillate and the current flowing through the stator winding is not modulated so that the demodulator does not then produce said output signal. Thus with an arrangement in accordance with the last-mentioned aspect of the invention, a check as to whether the rotor of the gyroscope is rotating, as required, at synchronous speed is provided by said indicating and/or controlling means, since response of such means is obtained only when the demodulator detects the modulation component.

Preferably the demodulator comprises a diode detector.

Preferably the means for deriving a voltage signal comprise a resistor connected in series with the stator winding of the motor.

Preferably the indicating and/or controlling means comprise a bistable means having first and second stable states, the bistable means being in its first stable state in the absence of an output signal from the demodulator, and, in the presence of an output signal from the demodulator, being arranged to be triggered from its first stable state to its second stable state and back to its first stable state during each cycle of the output signal of the demodulator.

According to a feature of this invention the arrangement also comprises means for rotating the rotor about the precession axis.

The means for rotating the rotor about the precession axis determine if the rotor is capable of rotation about the precision axis and the gyroscope is capable of detecting rotation about the input axis.

In a preferred embodiment the motor is of the kind specified and the means for rotating the rotor about the precession axis comprise an electromagnet arranged to be energised from the same alternating source as the stator windings of the motor and which when energised produces a magnetic field which interacts with the poles on the rotor so as to exert a force on the rotor tending to rotate the rotor about the precession axis.

The current flowing, in operation, through a stator winding of the motor has its amplitude modulated by a modulating component having the frequency of the oscillation of the rotor if the rotor is rotating at synchronous speed as has been described. The demodulator then produces an output signal so that the electromagnet can be energised. If the electromagnet is then energised a force is exerted on the rotor which rotates it about the precession axis. In this arrangement it is therefore possible to check if the rotor is rotating at a predetermined rotational speed and if it is capable of precession about the precession axis.

Preferably the indicating and/or controlling means are arranged to prevent the energisation of the electromagnet when the demodulator does not produce an output signal.

Preferably the indicating and/or controlling means comprise a relay arranged to control the energisation of the electromagnet, the relay being controlled by the bistable means so that when the bistable means is in its first stable state energisation of the electromagnet is prevented, and when the bistable means is in its second stable state energisation of the electromagnet is not prevented, the response of the relay being slow so that when the bistable means are triggered at the frequency of the output signal of the demodulator energisation of the electromagnet is continuously permitted.

According to yet another aspect of this invention we provide a test assembly for a rate gyroscope, the test assembly comprising first detecting means arranged to detect if the rotor can rotate about the precession axis and second detecting means arranged to detect if the rotor is rotating at a desired rotational speed about the spin axis, the first detecting means being connected to the second detecting means so as to be inoperative unless the rotor is rotating at said rotational speed.

If the test assembly is adapted for use with a rate gyroscope which includes a synchronous alternating current motor of the kind specified, it is preferred that the first detecting means comprise an electromagnet adapted to be fitted onto the rate gyroscope so that when it is energised with alternating electric current it produces a magnetic field of alternating sense for interacting with the poles on the rotor so as to exert a force on the rotor tending to rotate the rotor about the precession axis. If the test assembly is adapted for use with a rate gyroscope including a synchronous alternating current motor having the stated characteristic, the second detecting means preferably comprise means for deriving a voltage signal dependent on the current flowing in a stator winding of the motor, a demodulator which is connected so as to be fed with said voltage signal, and which is responsive to a modulation component of said signal which component is dependent upon said oscillation of the rotor, means responsive to the output signal of the demodulator connected to the first detecting means so that the first detecting means are inoperative unless the demodulator produces an output signal. It is preferred that the means responsive to the output signal of the demodulator are arranged so that the electromagnet can only be energised when the demodulator produces an output signal and that the assembly comprises a manually operable switch arranged to control the energisation of the electromagnet.

Preferably the electromagnet comprises a yoke of magnetic material which surrounds the rotor and lies in the plane in which the spin and input axes both lie, the yoke being provided with at least one pole piece which projects towards the precession axis, and with a winding arranged to be energised from the same alternating current source as the stator windings of the motor.

Preferably the demodulator comprises a diode detector.

Preferably the means for deriving a voltage signal comprise a resistor connected in series with the stator winding of the motor.

Preferably the means responsive to the output signal of the demodulator comprise a bistable means having first and second stable states, the bistable means being in its first stable state in the absence of an output signal from the demodulator, and, in the presence of an output signal from the demodulator, being arranged to be triggered from its first stable state to its second stable state and back to its first stable state during each cycle of the output signal of the demodulator.

Preferably the means responsive to the output signal of the demodulator comprise a relay arranged to control the energisation of the electromagnet, the relay being controlled by the bistable means so that when the bistable means is in its first stable state energisation of the electromagnet is prevented, and when the bistable means is in its second stable state energisation of the electromagnet is not prevented, the response of the relay being slow so that when the bistable means are triggered at the frequency of the output signal of the demodulator energisation of the electromagnet is continuously permitted.

An arrangement comprising a rate gyroscope and a test assembly in accordance with this invention will now be described with reference to the accompanying drawings of which:

FIGURE 5 shows a modification of FIGURE 3.

Figure 1:
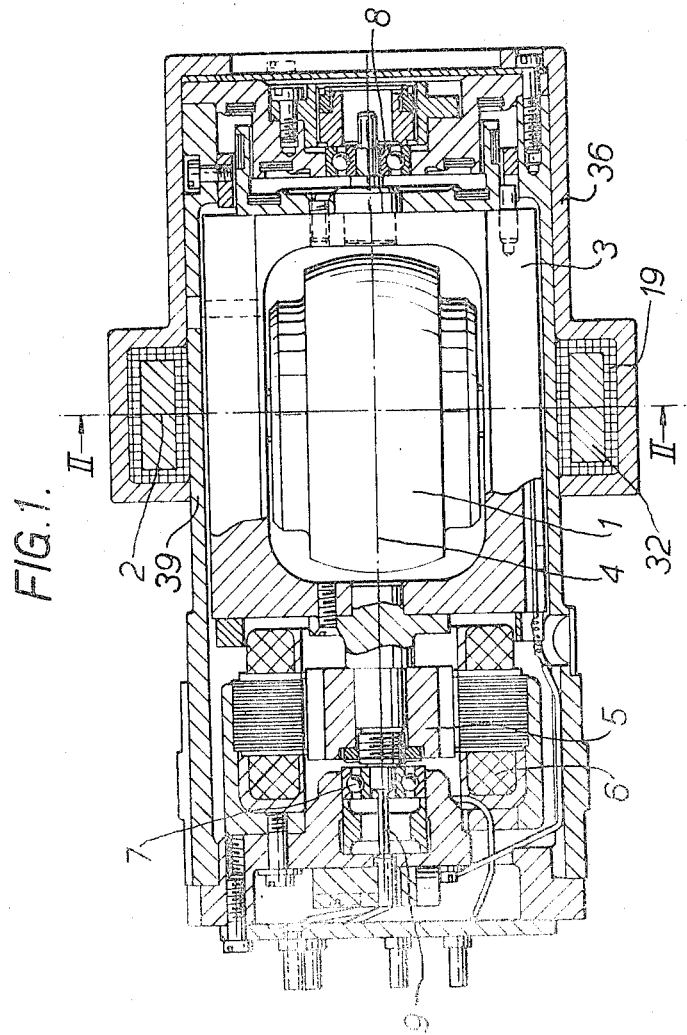
FIGURE 1 is a sectional elevation of the rate gyroscope.
Figure 2:
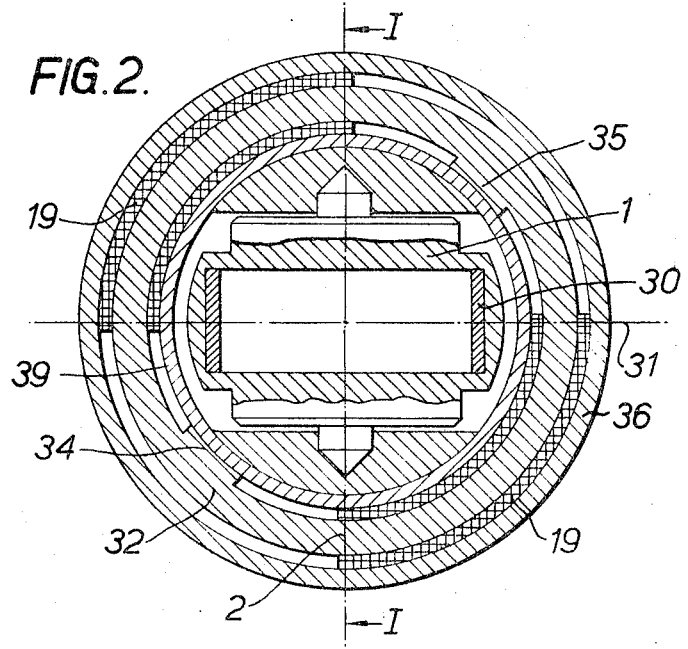
FIGURE 2 is a sectional elevation along the line II—II on FIGURE 1, the section of FIGURE 1 being taken on the line I—I of FIGURE 2.

Referring to FIGURES 1 and 2 the rate gyroscope has a conventional three phase alternating current hysteresis motor having a rotor 1. The rotor 1 is rotatable about a spin axis 2 and is mounted within a gimbal structure 3 which is able to precess about a precession axis 4 within bearings 7 and 8. Precession of the gimbal structure 3 is restrained by a torsion bar 9, and an electromagnetic pick-off having a rotor 5 and a stator 6 measures the precession of the gimbal structure 3 about the precession axis 4. Further details of the construction of the rate gyroscope are given in U.S. Patent No. 3,156,121 of W. R. Simons issued November 10, 1964. The rotor 1 is provided with a tungsten steel driving ring 30 which drives it about the axis 2. The rate gyroscope is sensitive to rotation about an input axis 31 when, in operation, it precesses about the precession axis 4. A circular yoke 32 surrounds the casing 39 of the rate gyroscope and lies in the plane in which the spin axis 2 and the input axis 31 both lie (that is to say the plane of FIGURE 2) and its axis is colinear with the precession axis 4. The yoke 32 which is constructed from a high permeability magnetic material such as soft iron, is toroidally wound with a winding 19. The yoke 32 is provided with pole pieces 34 and 35 which project towards the axis 4 and lie midway between the axis 2 and 31. The yoke 32 and its winding 19 are held in place by a generally circular casing 36.

Figure 3:
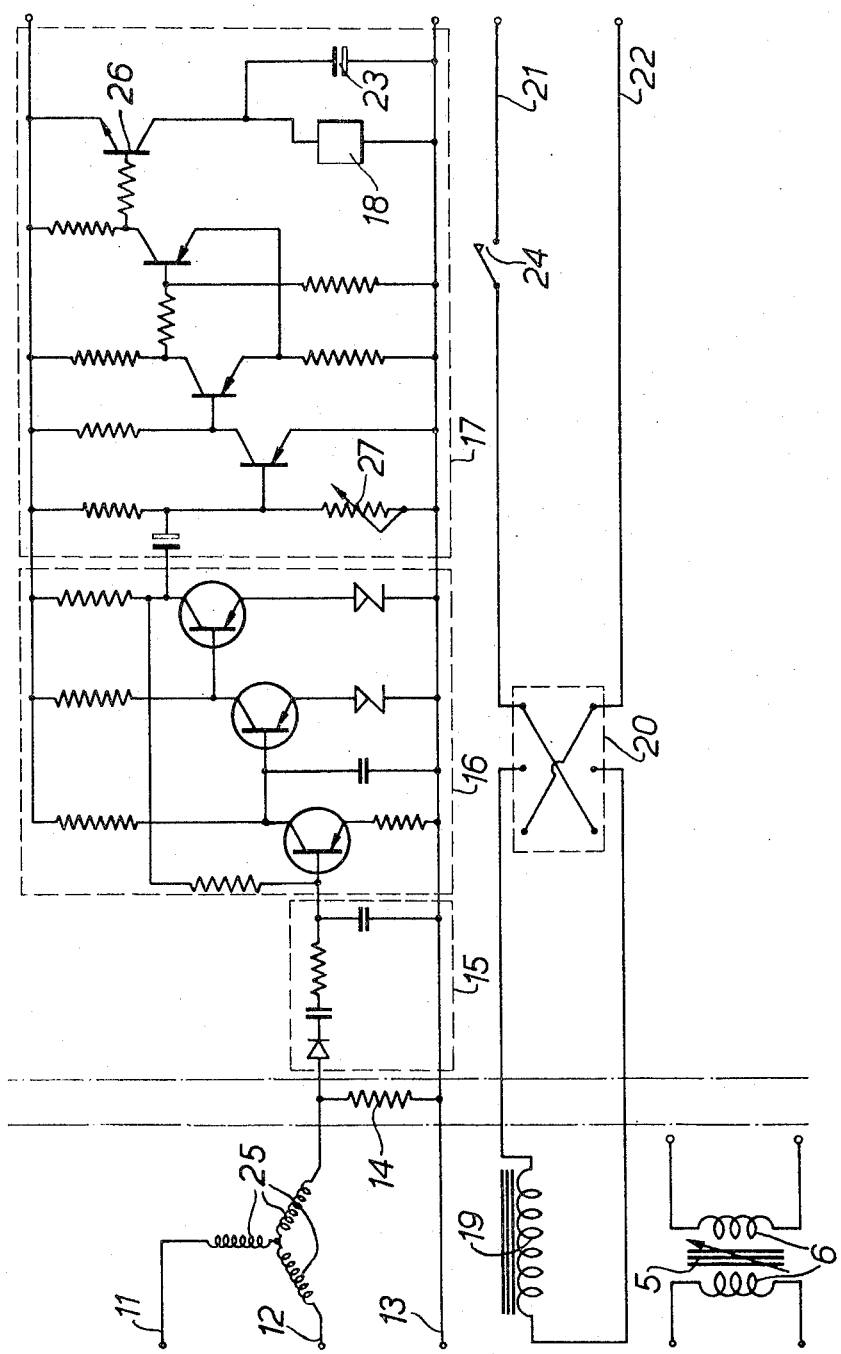
FIGURE 3 is a circuit diagram of the arrangement.

Referring now to FIGURE 3, the stator coils 25 of the motor are energised with three phase alternating current energy at a frequency of 400 c./s. through three leads 11, 12 and 13. A resistor 14 is connected in the lead 13 and the voltage signal appearing across the resistor 14 is applied to a diode detector 15. The frequency of the voltage signal appearing across the resistor 14 when the rotor 1 of the motor is rotating at synchronous speed (and therefore has a low frequency oscillation superimposed on its rotational motion) is that of the A.C. current with which the stator is energised and its amplitude is modulated at the frequency of the low frequency oscillation. In this condition the detector 15 produces a small output signal which is at the modulating frequency. This output signal is applied through an amplifier 16 to a bistable trigger circuit 17. The amplifier 16 is a directly coupled three stage amplifier with negative feedback.

The trigger circuit 17 has a Schmitt trigger circuit arranged to drive a transistor 26 which has the energising coil of a relay 18 and a capacitor 23, in parallel, connected as its collector load. A variable resistor 27 is incorporated in the trigger circuit 17 so that the triggering voltages may be adjusted. It is arranged that in the absence of an output signal from the amplifier 16, the trigger circuit 17 remains in the stable state (say the "0" state) in which the contacts 24 of the relay 18 remain open. When the trigger circuit 17 is in its other stable state (the "1" state) the contacts 24 remain closed. When the trigger circuit 17 is fed from the amplifier 16 with an alternating current at the modulating frequency it is triggered from the "0" state to the "1" state and back to the "0" state during every cycle of the modulating frequency. The effect of the capacitor 23 is to slow down the response of the relay 18 so that the contacts 24 remain continuously closed when the trigger circuit 17 is triggered at the frequency of the modulating frequency.

The contacts 24 and a manually operable switch 20 are arranged to control the current through the winding 19 which is arranged to be energised through leads 21 and 22. The leads 21 and 22 are connected to an alternating current supply at the same frequency and phase as the potential appearing between the leads 11 and 13 but at a lower voltage.

The yoke 32 is unenergised but is left in position surrounding the rate gyroscope during normal use of the gyroscope. The detector 15, the amplifier 16, the trigger circuit 17 and the switch 20 form a separate test assembly. When the gyroscope is to be tested, the test assembly is connected to the gyroscope and to the winding 19 and the switch 20 is operated.

The operation of the arrangement will now be described. The voltage signal across the resistor 14 is continuously fed to the detector 15. If the rotor 1 of the rate gyroscope is rotating at synchronous speed oscillations at a low frequency are superimposed on its rotational motion. The currents then flowing in the stator windings of the gyroscope motor are amplitude modulated at the frequency of the oscillations. The voltage signal across the resistor 14 is an alternating voltage at 400 c./s. with its amplitude modulated at the frequency of the oscillations and the output signal of the detector 15 has the frequency of the modulating voltage. The output signal is amplified by the amplifier 16 and triggers the trigger circuit 17 at the modulating frequency, thereby holding the contacts 24 of the relay 18 closed. If the switch 20 is closed the winding 19 is energised and the pole pieces 34 and 35 become magnetic poles of opposite and alternating polarities. The ring 30 is, in use, traversed diametrically by a rotating magnetic field so that magnetic poles which rotate at a speed of 400 revolutions per second are effectively formed in it. The poles formed in the pole pieces 34 and 35 change their polarity at 400 c./s. and it is arranged that when a pole of the ring 30 is adjacent to the pole piece 34 or 35, the pole in that pole piece has the opposite polarity. The poles of the ring 30 and the poles on the pole pieces 34 and 35 are attracted to each other, thereby rotating the rotor 1 about the precession axis. The rotation of the rotor 1 is measured by the pick-off and the signals generated by the pick-off stator 6 may be displayed to indicate that the gyroscope is functioning normally or used as test signals to test an autopilot or flight system in which the rate gyroscope is incorporated.

When the rotor 1 is not rotating or is rotating at less than synchronous speed, the voltage signal across the resistor 14 is not modulated. The detector 15 does not produce an output signal so that no signal is fed to the amplifier 16 and the contacts 24 remain open. If the switch 20 is then closed, the winding 19 is not energised so that rotor 1 does not rotate about the axis 4 and no signal is generated by the pick-off. Similarly if the rotor rotates at synchronous speed about the spin axis 2 but is unable to rotate about the precession axis 4 for any reason, no signal is generated by the pick-off stator 6. The absence of a signal generated by the stator 6 is an indication that the gyroscope is not functioning normally.

In a modification the poles of the pole pieces 34 and 35 are arranged to have the same polarity as an adjacent pole of the ring 30 so that the adjacent poles repel each other and rotate the rotor 1 about the axis 4.

In another modification, the resistor 14, the detector 15, the amplifier 16, the trigger circuit 17, the switch 20, the winding 19, the yoke 32 and the casing 36 form a separate test assembly. The yoke 32 and the casing 39 of the rate gyroscope are then shaped so the yoke 32 may be fitted onto the casing 39 in a definite angular position with respect to the axes 2 and 31.

Figure 4:
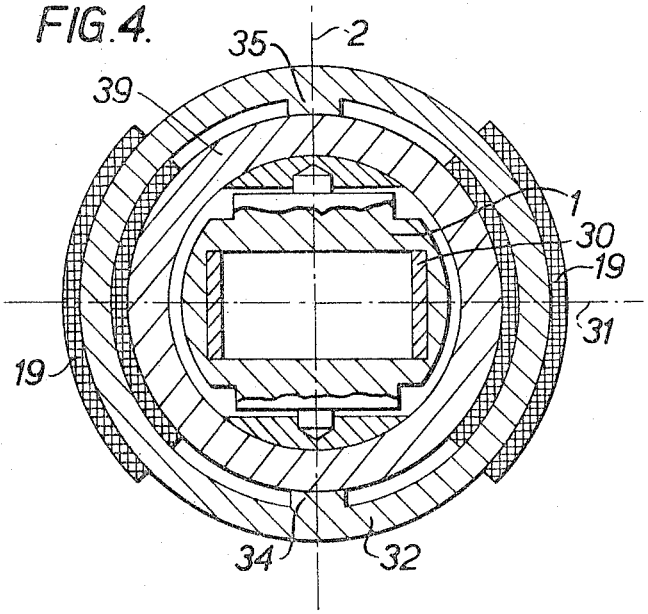
FIGURE 4 shows a modification of FIGURE 2.

Referring now to FIGURE 4, the only difference between the arrangement it shows and that shown in FIGURE 2 is that the pole pieces 34 and 35 are disposed on the axis 2 instead of being disposed midway between the axes 2 and 31. It has been found that if the pole pieces 34 and 35 are disposed on the axis 2, an increased torque is applied to the ring 30 and the rotor 1 when the winding 19 is energised.

In another modification shown in FIGURE 5, the detector 15 and the trigger circuit 17 are changed (FIGURE 5 only shows the detector 15, the amplifier 16 and the trigger circuit 17). The detector 15 is modified by introducing a single stage of amplification employing a transistor 40, which is capacitively coupled between the the resistor 14 and the diode 41 of the detector 15. The amplifier 16 is a directly coupled three stage amplifier (employing transistors 42, 43 and 44) with negative feedback.

The output signal of the amplifier 16 is fed to a single stage amplifier (employing a transistor 45) in the trigger circuit 17. This bias applied to the base of the transistor 45 is set by a chain of resistors which includes a resistor 50 having a large coefficient of change of resistance with temperature. The bias thus changes when the temperature changes for a purpose that will be explained. The signal appearing at the collector of the transistor 45 is passed to an emitter follower (employing a transistor 46). The signal appearing at the emitter of the transistor 46 is passed to a complementary pair bistable circuit (employing transistors 47 and 48). In one stable state of the bistable circuit, transistors 47 and 48 are both conducting and in the other stable state neither of them is conducting. The bistable circuit triggers from the state in which both transistors are conducting at a particular value of the potential of the base of the transistor 46 and triggers from the state at which neither transistor conducts at another value of the potential of the base of the transistor 46. The two values are not identical but are close together and also change with a change in ambient temperature. The resistor 50 alters the potential of the collector of the transistor 45 for a given signal applied to its base when the temperature changes in the sense to compensate for the aforesaid changes of the values.

The bistable circuit drives the transistor 26 which has the energising coil of the relay 18 and the capacitor 23, in parallel, connected as its collector load.

The operation of the circuit shown in FIGURE 5 is very similar to that of FIGURE 3. The voltage appearing across the resistor 14 is amplified and demodulated by the detector 15. A signal at the frequency of the modulating voltage is applied to the amplifier 16 if the rotor 1 is rotating at synchronous speed. The amplifier 16 amplifies the signals applied to it and the amplified signal is passed to the detector 17. The bistable circuit is triggered at the frequency of the modulating voltage and an alternating potential is applied to the base of the transistor 26. The response of the relay 18 is so slow that its contacts are held continuously open.

We claim:

1. A rate gyroscope comprising in combination a main casing, a gimbal structure mounted for precession in the main casing about a precession axis upon rotation of the gyroscope about an input axis at right angles to the precession axis, spring means for exerting spring restraint against precession of the gimbal structure about the precession axis from a datum position, an alternating current motor mounted in the gimbal structure and having a rotor mounted for rotation about a spin axis at right angles to the precession and input axes, and a stator having windings for applying a rotational magnetic field to the rotor, the rotor in normal use rotating together with the rotating field to produce magnetic poles at the periphery of the rotor, and an electromagnet for applying a magnetic field to the rotor which interacts with said magnetic poles to produce a force tending to rotate the rotor about said precession axis.

2. The combination claimed in claim 1 wherein said electromagnet comprises a yoke of magnetic material which surrounds said rotor and lies in the plane of the spin and input axes, said yoke being provided with at least one pole piece which projects towards the precession axis and is spaced apart from the input axis.

3. The combination claimed in claim 2 wherein said electromagnet includes a winding which is connected in parallel with a stator winding of the motor.

4. The combination claimed in claim 2 wherein said yoke has two pole pieces disposed on the spin axis of the rotor.

5. The combination claimed in claim 2 wherein said yoke is annular and its axis is collinear with the precession axis.

6. The combination claimed in claim 1 which comprises means responsive to the rotation of said rotor at a predetermined rotational speed, said means permitting energization of the electromagnet only when the rotor is rotating at the predetermined rotational speed.

7. Test equipment for a rate gyroscope, said gyroscope having a motor of the synchronous alternating-current type which includes a rotor and a stator, said test equipment including means for detecting whether the rotor is rotating at a predetermined rotational speed and comprising, signal deriving means for deriving a voltage signal dependent on the current flowing in a stator winding of the motor, said voltage signal comprising a low frequency alternating current signal modulating the higher frequency power energization of said stator winding when said rotor is rotating at said predetermined rotational speed, and output means operatively connected to said signal deriving means and responsive to said low frequency alternating current signal for producing a manifestation representative of rotation of said rotor at said predetermined speed.

8. Test equipment as claimed in claim 7 wherein said output means comprises a diode detector.

9. Test equipment as claimed in claim 7 wherein said rotor rotates about a spin axis and is supported by a gimbal structure permitting precession about a precession axis which is at right angles to said spin axis, said test equipment including additional detector means for detecting whether the gimbal structure can rotate about said precession axis, said additional detector means comprising an electromagnet for exerting magnetic force to rotate said rotor and supporting gimbal structure together about said precession axis.

10. Test equipment as claimed in claim 9 including electrical circuit means that is selectively operable to energize said electromagnet, and means to operate said circuit means only in response to said manifestation representative of rotation of said rotor at said predetermined speed.

11. Test equipment as claimed in claim 9 wherein said output means comprises a selectively energizable relay, and bistable circuit means for energizing said relay, said bistable state circuit means having two stable states of operation and being coupled to said signal deriving means to be switched from a first to a second of said two stable states through a cycle of operation in response to each cycle of said low frequency alternating signal, said relay being energized by said bistable circuit means only when said bistable circuit means is in its second state, said relay having sufficiently slow operating characteristics to remain actuated when said bistable circuit means operates between its two states in response to said low frequency alternating current signal.

12. Test equipment for a rate gyroscope comprising, first detecting means for detecting whether the rotor of the rate gyroscope can rotate about the precession axis of the gyroscope and second detecting means for detecting whether the rotor is rotating at a predetermined rotational speed about the spin axis of the gyroscope, means operatively coupling said first detecting means to the second detecting means for rendering said first detecting means inoperative unless the rotor of said rate gyroscope is rotating at said predetermined rotational speed.

13. A motor speed indicating means for a hysteresis motor comprising, a rotor, said rotor including a hysteresis ring exhibiting a characteristic low frequency oscillation only when said rotor is rotating at synchronous speed, stator means including a stator winding for applying a rotating magnetic field to said rotor, means responsive to the energization of said stator windings with alternating current to derive a voltage signal dependent on the current flowing in said stator, detector means for detecting the presence of a low frequency modulation component in the stator winding energization resulting from said low frequency oscillation of said rotor, and means responsive to said detector means to indicate that said rotor is rotating at its predetermined synchronous speed.

14. A motor speed indicating means as described in claim 13 wherein said responsive means comprises a resistor connected in series with the stator winding of the motor.

15. In combination, a rate gyroscope including an alternating-current gyroscope motor having a rotor mounted for rotation about the spin axis of the gyroscope and a stator having windings for applying a rotating magnetic field to the rotor, the rotor in normal use rotating together with the magnetic field so that magnetic poles are produced at the periphery of the rotor, first detecting means for detecting whether said rotor can rotate about the precession axis of the gyroscope, said first detecting means comprising an electromagnet which is fitted over the rate gyroscope and which when energized with alternating-current energy produces a magnetic field which interacts with the poles of the rotor to produce a force acting to rotate the rotor about the precession axis of the gyroscope, and second detecting means for detecting whether the rotor is rotating at a predetermined rotational speed about the spin axis of the gyroscope, means operatively coupling said first detecting means to the second detecting means for rendering said first detecting means inoperative unless the rotor is rotating at said predetermined rotational speed.

16. Test equipment as claimed in claim 15 wherein the electromagnet comprises a yoke of magnetic material which is fitted over the casing of the gyroscope and surrounds the rotor and lies in the plane in which the spin and input axes of the gyroscope both lie, the yoke being provided with at least one pole piece which projects towards the precession axis and is spaced apart from the input axis.

17. Test equipment as claimed in claim 16 wherein said electromagnet comprises a winding which is connected in parallel with a winding of the motor.

18. In combination, a rate gyroscope having a gyroscope motor which is a synchronous alternating-current motor having the characteristic that when the rotor is lightly loaded and is rotating at synchronous speed that a low frequency oscillation is superimposed on the rotational motion of the rotor; first detecting means for detecting whether said rotor can rotate about the precession axis of the gyroscope; and second detecting means for detecting whether the rotor is rotating at a predetermined rotational speed about the spin axis of the gyroscope; said second detecting means comprising means for deriving a voltage signal dependent on the current flowing in a stator winding of the motor, a demodulator responsive to a modulation component of said signal which component is dependent upon said oscillation of said rotor, and means responsive to the output signal of said modulator and connected to said first detecting means to permit operation of the first detecting means only when said demodulator produces an output signal.

19. Test equipment as claimed in claim 18 wherein the means for deriving a voltage signal comprises a resistor connected in series with a stator winding of the motor.

20. Test equipment for a rate gyroscope comprising, first detecting means for detecting whether the rotor of the rate gyroscope can rotate about the precession axis of the gyroscope, said first detecting means comprising an electromagnet which is fitted over the rate gyroscope for producing a magnetic field when energized that exerts a force on the rotor of the gyroscope tending to rotate it about the precession axis of the gyroscope, and second detecting means for detecting whether the rotor is rotating at a predetermined rotational speed about the spin axis of the gyroscope, and means operatively coupling said first detecting means to said second detecting means for rendering said first detecting means inoperative unless the rotor of said rate gyroscope is rotating at said predetermined rotational speed.

References Cited by the Examiner

UNITED STATES PATENTS

| | | | |
|---|---|---|---|
| 2,588,607 | 3/1952 | Barkalow | 74—5.47 |
| 2,864,255 | 12/1958 | Stern | 74—5.4 |
| 3,077,760 | 2/1963 | Packard | 74—5.4 X |
| 3,125,886 | 3/1964 | Lassen | 74—5.6 |
| 3,218,872 | 11/1965 | Swainson | 75—5 X |

FRED C. MATTERN, JR., *Primary Examiner.*

BROUGHTON G. DURHAM, *Examiner.*

J. D. PUFFER, *Assistant Examiner.*